Figure 1:
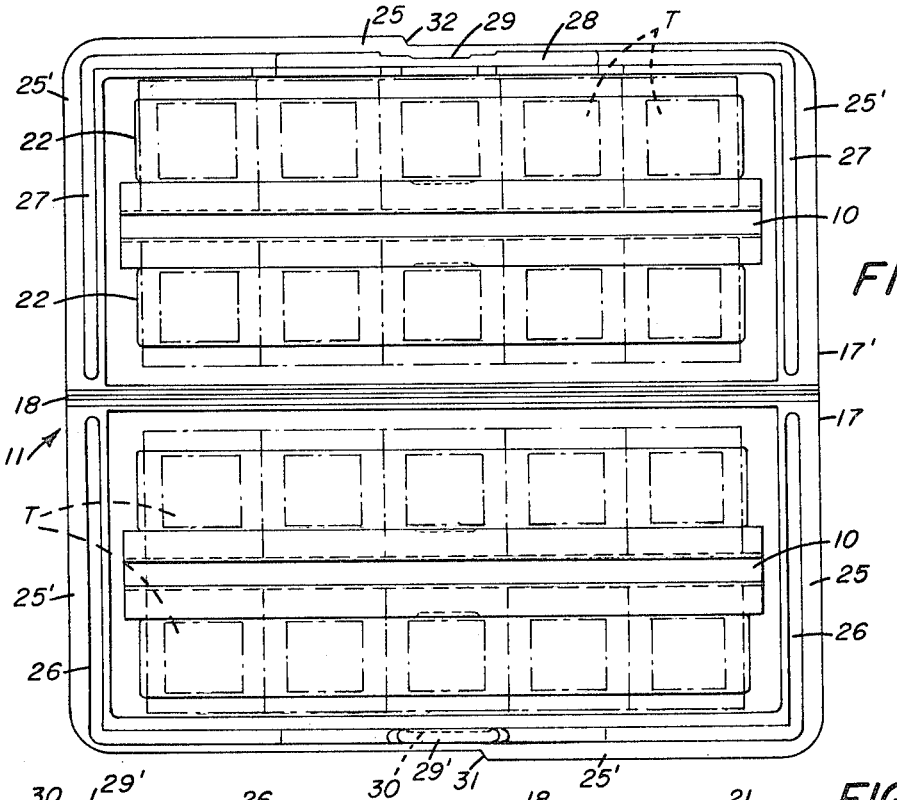
Figure 3:
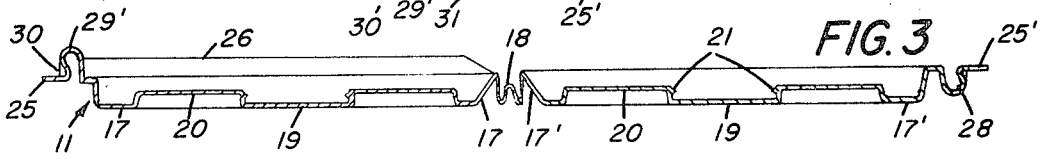
Figure 2:
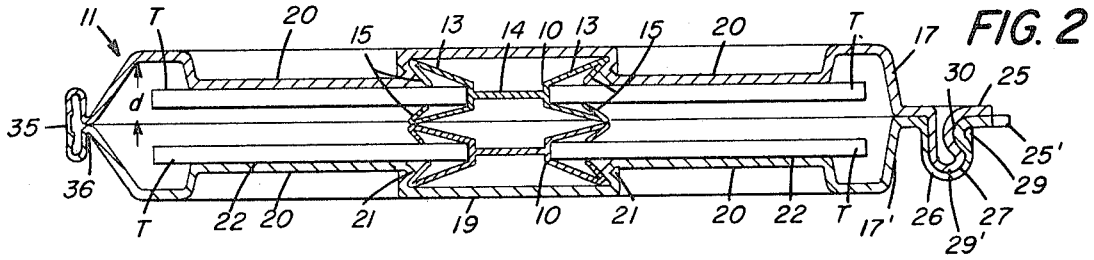
Figure 4:
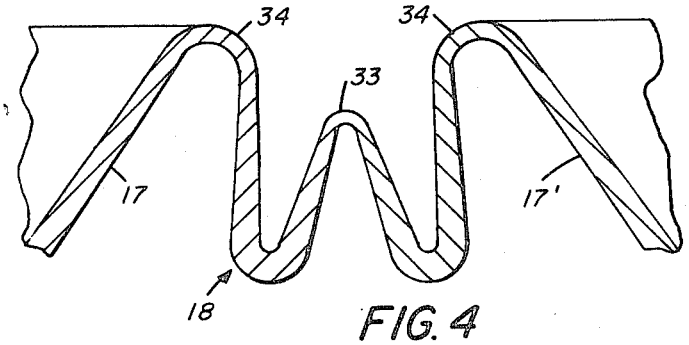

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MARCH 27, 1973

908 O.G. 789

T908,006

PACKAGE FOR TRANSPARENCY SLIDES

Arthur C. Rissberger, Jr., Webster, and George J. Richards and Adrian C. Runions, Rochester, N.Y., assignors to Eastman Kodak Company, Rochester, N.Y.

Filed Nov. 10, 1971, Ser. No. 197,252

Int. Cl. G09f *15/00*

U.S. Cl. 40—106.1

1 Sheet Drawing. 21 Pages Specification

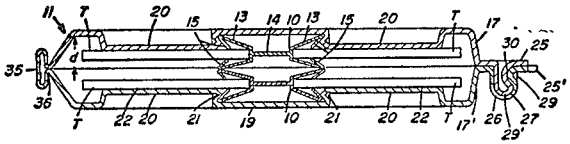

A package for returning a customer's processed and slide mounted transparencies which, in addition to protecting the slides against damage and dust during shipment, can be used as a viewer and/or as an editor for the slides. The package comprises a slide stick on which a plurality of slides are held by their edges in side-by-side relation and a hinged receptacle or wallet in which the sticks of slides are releasably retained with the slides lying flat in each side of the receptacle. The receptacle is made of transparent or translucent plastic which allows the slides to be viewed by transmitted and/or reflected light while in situ in the receptacle after the receptacle is hinged open.

March 27, 1973 A. C. RISSBERGER, JR., ET AL T908,006

PACKAGE FOR TRANSPARENCY SLIDES

Filed Nov. 10. 1971

ARTHUR C. RISSBERGER, JR
GEORGE J. RICHARDS
ADRIAN C. RUNIONS
INVENTORS

BY

ATTORNEY